United States Patent [19]

Shidler

[11] Patent Number: 5,088,563

[45] Date of Patent: Feb. 18, 1992

[54] HYDRAULIC FOLDING SYSTEM FOR FARM IMPLEMENTS

[76] Inventor: John M. Shidler, R.R. 3, Box 390, Lawrenceville, Ill. 62439

[21] Appl. No.: 569,402

[22] Filed: Aug. 17, 1990

[51] Int. Cl.⁵ .............................................. A01B 73/02
[52] U.S. Cl. .................... 172/456; 172/311; 172/501
[58] Field of Search ............. 172/456, 311, 776, 666, 172/667, 654, 501, 503

[56] References Cited

U.S. PATENT DOCUMENTS

| | | | |
|---|---|---|---|
| 3,021,908 | 2/1962 | Dlugosch | 172/456 X |
| 3,797,580 | 3/1974 | Roth | 172/501 X |
| 4,023,623 | 5/1977 | Anderson | 172/456 X |
| 4,159,038 | 6/1979 | Eichenberger | 172/311 |
| 4,299,292 | 11/1981 | Hughes | 172/311 |
| 4,512,416 | 4/1985 | Smith | 172/501 X |
| 4,683,957 | 8/1987 | Bussiere | 172/311 |
| 4,862,758 | 9/1989 | Magee | 172/311 X |

FOREIGN PATENT DOCUMENTS 86402  1/1959  Denmark ............. 172/501

Primary Examiner—Randolph A. Reese
Assistant Examiner—Jeffrey L. Thompson
Attorney, Agent, or Firm—H. John Barnett

[57] ABSTRACT

A folding system for large, agricultural implements which includes special stops, push-off arms, and support stands to avoid putting excessive strain on the hydraulic system or the implement. Special floating links are also provided on each wing section of the agricultural implement which cooperate with the push-off arms and the support stands to limit the strain placed on the folding system. In addition, the floating links allow the unfolded wings of the implement to have much more flexibility over irregular terrain.

1 Claim, 1 Drawing Sheet

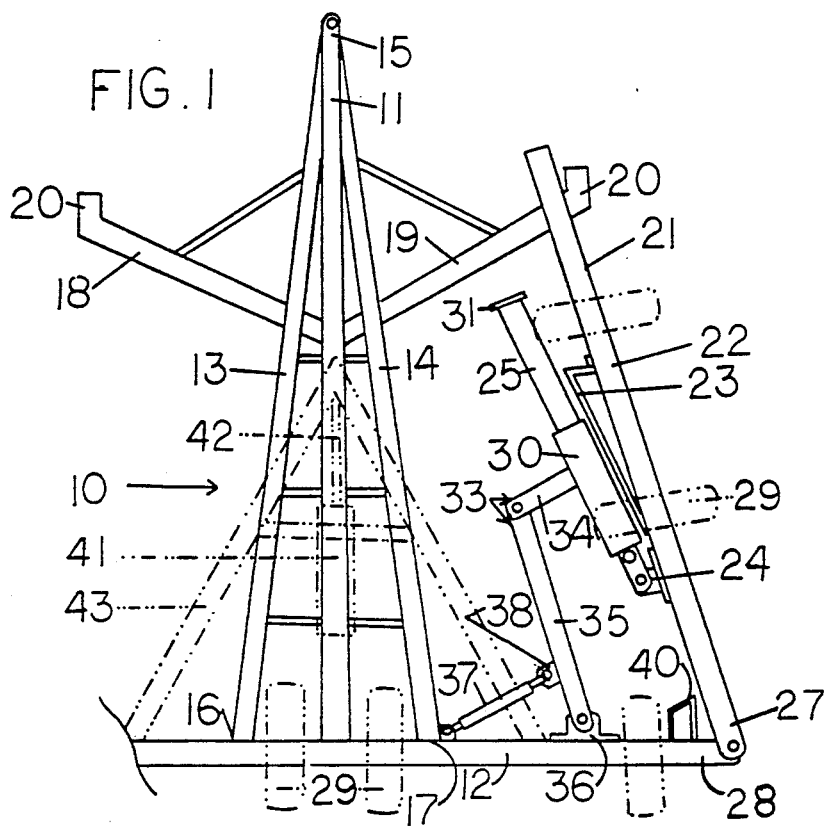
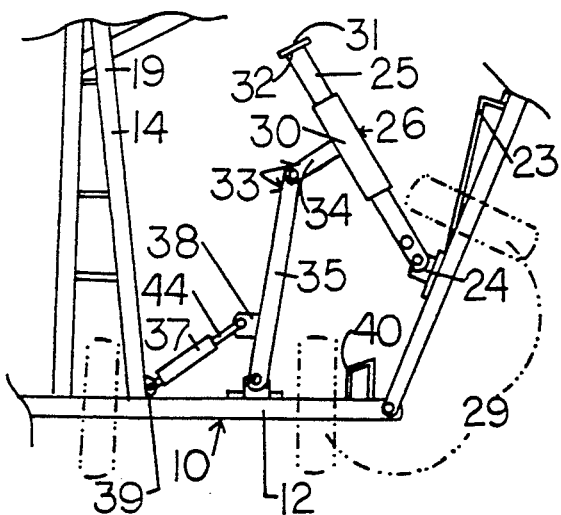
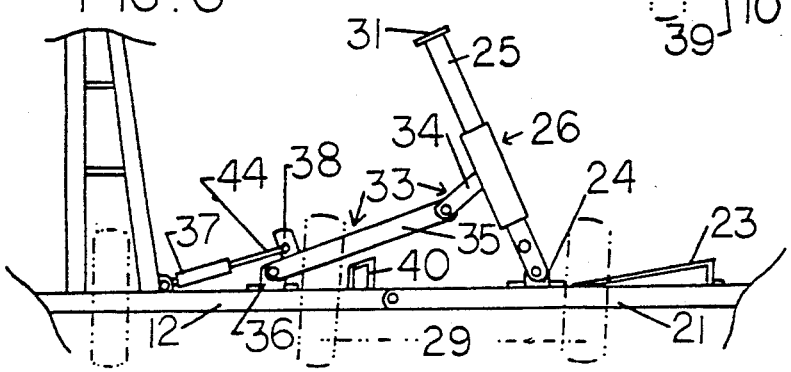

HYDRAULIC FOLDING SYSTEM FOR FARM IMPLEMENTS

BACKGROUND OF THE INVENTION

1. Field of the Invention

This invention relates to tractor-drawn agricultural implements which cover a wide swath, and more particularly, to a hydraulic folding system for such implements. The folding system is designed to be completely automatic, so that the equipment operator is not required to leave the operator station either for folding or unfolding the implement.

2. Description of the Related Art

The following patents relate to hydraulic folding systems for farm implements:

| Patent No. | Inventor(s) | Date |
| --- | --- | --- |
| 3,944,001 | Warner et al | 1976 |
| 4,031,965 | Blair | 1977 |
| 4,043,099 | Cheatum | 1977 |
| 4,047,575 | Wagner | 1977 |
| 4,660,654 | Wiebe et al | 1987 |
| 4,813,489 | Just et al | 1989 |

Warner et al describes a hydraulic folding system for a disc cultivator in which the wing folds 180° on top of the main section for transport. There are no special shoulder fulcrums in Warner et al, and the folding is over the top of the main section from the auxiliary section. There is only one auxiliary section, and it is lifted through a vertical arc, which puts quite a strain on the hydraulic lifting mechanism.

Blair describes a wing folding kit having a centrally mounted, floating cylinder with linkage arms hinged on its ends. These arms are attached by lost motion links to cross members of the wings. When the central cylinder contracts, the wings are folded vertically or horizontally. A hydraulic cylinder on the central drawbar section is connected to move all the sections to a vertical position, and then the wings are folded forward. Blair appears to have all the folding motions of the subject invention, but has no special shoulder fulcrums or a support stand for the wing sections. There is only one hydraulic cylinder for folding both wings of the implement.

Cheatum describes a hydraulic system to swing a baler between a field position and a transport position without the operator leaving the seat on the tractor. Solenoids control the hydraulic valves, and the solenoids are controlled from the tractor to move the baler between field and transport positions.

The Wagner patent is directed to a folding apparatus which has a lost motion connection with the main section of his disc harrow to permit the wing section to float up and down about its longitudinal pivot connection to the main section. Wagner has an abutment member disposed above a part of the slot to insure that the end of the jack will not shift from its position at the laterally outer end of the slot. The wings are first raised to a vertical position, and then folded back instead of forward.

Wiebe et al is primarily concerned with an automatically pivoted biased latch. Each wing is folded upwardly to a vertical position for transport, and there is no forward folding of a wing section. The foldable packer harrow implement of Just et al folds to a vertical position, and then folds back, not forward (See FIG. 4).

SUMMARY OF THE INVENTION

The improved hydraulic folding system of the subject invention includes special stops, push-off arms, and support stands to avoid putting excessive strain on the hydraulic system or the implement. Special floating links are also provided on each wing section of the agricultural implement which cooperate with the push-off arms and the support stands to limit the strain placed on the folding system.

In addition, the floating links allow the unfolded wings of the implement to have much more flexibility over irregular terrain. The folding system allows the implement wing sections to flex as much as three feet down and four feet up to follow the terrain of the field.

BRIEF DESCRIPTION OF THE DRAWINGS

FIG. 1 is a schematic, top plan view of the folding system of the invention with some parts omitted and some parts broken away, and some parts shown in phantom, and showing the right wing support frame section of the implement in the completely folded position;

FIG. 2 is similar to FIG. 1, but showing the right wing support frame section partially unfolded; and FIG. 3 is similar to FIG. 2, but showing the right wing support frame section in the fully unfolded condition just prior to rotating the main support frame section and wing support frame sections from the vertical folding position to the horizontal operating condition.

DESCRIPTION OF THE PREFERRED EMBODIMENT

As shown in the drawings, a foldable harrow frame 10 includes a tongue 11 which extends rearwardly from a tractor (not shown) to connect to a main frame 12, which extends generally at right angles to the tongue 11. A pair of diagonal reinforcing struts 13 and 14 extend rearwardly from front end 15 of the tongue 11 to corresponding attachment points 16 and 17 on the reinforcing struts 13 and 14, respectively.

The front end 15 of the tongue 11 is provided with a pair of laterally extending rest stands 18 and 19. Each rest stand terminates in a downwardly angled ramp 20, which facilitates the final folding of the respective wing sections.

Right wing section 21 comprises a main support bar 22, a push-off arm 23, and a bracket 24 to which outer end 25 of floating link 26 is attached. Inner end 27 of the support bar is pivotally attached to right outer end 28 of main frame 12. Support wheels 29 are shown in phantom at regular, spaced intervals along the support bar 22 and the main frame 12 to provide over-the-ground support for the foldable harrow frame 10.

The outer end 25 of floating link 26 slidably extends through a tubular member 30, which moves along floating link 26 during folding and unfolding of the wing section 21. A stop 31 is provided at inner end 32 of link 26 which retains the tubular member 30 in sliding relation to the floating link 26.

The tubular member 30 is pivotally connected to the main frame 12 by means of an arm 33 which comprises a short member 34 pivotally connected to a long member 35, which is pivotally connected at its inner end to bracket 36 on the main frame 12.

An operating hydraulic cylinder 37 is connected at its outer end to bracket 38 on the long member 35 and to bracket 39 on the main frame 12 at its inner end. A stop 40 is mounted on the main frame 12 just outboard from bracket 39. Operation of hydraulic cylinder 37 causes the wing section 21 to fold or unfold as will be described below.

FIG. 1 shows the harrow frame 10 in the completely folded position. The left side of the frame is a mirror image of the right side, and all motions described for the right side are mirrored in the left side of the frame.

For clarity of description, the vertically extending harrow elements have been omitted from FIGS. 1, 2, and 3. It is sufficient to point out that the harrow elements are secured to the frame and are rotated to the vertical position by the main operating hydraulic cylinder 41, shown in phantom in FIG. 1.

Cylinder 41 is mounted on the tongue 11, and cylinder rod 42 pushes on V-bar 43 (shown in phantom in FIG. 1) to raise the harrow (not shown) to a vertical position for convenient folding and unfolding. The main operating cylinder 41, V-bar 43, and the harrow are standard equipment, and their action forms no part of the novel folding system of the subject invention.

In the folded position, both the left wing section (not shown) and the right wing section 21 rest on their corresponding rest stands 18 and 19. This is a suitable position for transport behind a tractor (not shown).

When it is desired to unfold the harrow frame 10 for use in a field, hydraulic cylinder 37 is operated to initiate pushing by cylinder rod 44 against long member 35 of arm 33, as best seen in FIG. 2. The arm 33 pushes against push-off arm 23 and starts to pivot outwardly, while the short member 34 slides tubular member 30 along the floating link 26.

At the same time, main support bar 22 of the right wing section 21 is being pivoted outwardly, leaving its rest stand 19.

Further extension of cylinder rod 44 causes the arm 33 to become fully extended with the short member 34 and long member 35 almost in a straight line, and the main support bar 22 of the right frame section has pivoted to a 180° angle with the main frame 12. The harrow frame 10 is now ready to be lowered to the horizontal position, where it is supported on wheels 29 shown in phantom. As the harrow is lowered, the main harrow frame 10 and the left and right wing sections rotate 90°, so that floating link 26, tubular member 30 and associated arm 33 are in a vertical plane above the harrow frame 10 and the wing section 21. This provides a very flexible and resilient connection between the respective sections of the harrow to allow for wide variations in terrain as the harrow is used under field conditions.

It is contemplated that the folding system of the invention can be adapted to standard, foldable agricultural implements, and may be attached as a kit by well-known methods. One suitable attaching system employs U-bolts.

I claim:

1. An improved folding system for large agricultural implements adapted to be towed by a towing tractor, said implement having a main frame section and a pair of wing sections disposed laterally outboard on each side of the main frame section, said folding system having a main hydraulic cylinder assembly connected to the main frame section to raise the main frame and the wing sections from a horizontal operating position to a vertical position, and the reverse, with the wing sections unfolded, said folding system for each wing section comprising:

an elongated link member pivotally connected at its outer end to a foldable wing section of said implement;

a tubular member slidably mounted on the link member;

a jointed connecting arm connected at its outer end to the tubular member, and pivotally connected at its inner end to the main frame section;

a push-off arm mounted on the wing section which rests against the elongated link member and tubular member when said implement is in the folded position to facilitate the initial outward movement of the wind section when unfolding is commenced;

an auxiliary hydraulic cylinder assembly connected at its outer end to the jointed connecting arm intermediate its ends, said auxiliary hydraulic cylinder assembly being connected at its inner end to the main frame, whereby operation of the auxiliary hydraulic cylinder assembly causes the wing section to fold or unfold towards and away from the main frame section when the main frame and the wing sections are disposed in the vertical position;

a stop member mounted on the main frame adjacent the inner end of the jointed connecting arm to limit the outward pivoting of the connecting arm to prevent excessive strain on the auxiliary hydraulic cylinder assembly when folding of the wing sections is initiated, and during operation of the agricultural implement over irregular terrain; and a towing member centrally attached to the front of the main frame section of the agricultural implement, said towing member having a rest stand on which the wing sections come to rest in the folded position, whereby the complete folding and unfolding operation may be controlled by the operator of the towing tractor without leaving the operator's seat.

* * * * *